United States Patent
Kell

Patent Number: 5,924,057
Date of Patent: Jul. 13, 1999

[54] METHOD OF PREVENTING ODOMETER FRAUD

[75] Inventor: Howard A. Kell, Farmington Hills, Mich.

[73] Assignee: Ford Motor Company, Dearborn, Mich.

[21] Appl. No.: 08/881,841

[22] Filed: Jun. 25, 1997

[51] Int. Cl.$^6$ .................................................. G01B 7/02
[52] U.S. Cl. ............................ 702/165; 701/19; 701/33; 377/24; 377/26
[58] Field of Search .............................. 364/561, 424.04, 364/550; 372/26, 24; 702/165; 701/19, 33

[56] References Cited

U.S. PATENT DOCUMENTS

| | | | |
|---|---|---|---|
| 4,528,683 | 7/1985 | Henry | 377/24 |
| 4,559,637 | 12/1985 | Weber | 377/24 |
| 4,682,287 | 7/1987 | Mizuno et al. | 364/561 |
| 4,710,888 | 12/1987 | Burke et al. | 364/561 |
| 4,803,646 | 2/1989 | Burke et al. | 364/561 |
| 5,267,159 | 11/1993 | O'Neall | 364/424.04 |
| 5,297,178 | 3/1994 | Martin | 377/26 |
| 5,579,242 | 11/1996 | Fisher | 364/550 |

*Primary Examiner*—Kamini Shah
*Attorney, Agent, or Firm*—Paul K. Godwin; Roger L. May

[57] ABSTRACT

A method is provided for preventing odometer fraud on a vehicle having a multiplex ring including a plurality of vehicle control modules in electrical communication with each other. The multiplex ring includes a cluster control module with an odometer display. The method includes: a) displaying an odometer mileage variable; b) periodically storing the displayed odometer mileage variable in a non-volatile memory location in the cluster control module; and c) periodically storing the displayed odometer mileage variable in a non-volatile memory location in at least one of the vehicle control modules other than the cluster control module, thereby increasing the level of difficulty of odometer tampering.

8 Claims, 1 Drawing Sheet

METHOD OF PREVENTING ODOMETER FRAUD

TECHNICAL FIELD

A method of preventing odometer fraud, and more particularly to a method of preventing odometer fraud in a vehicle which includes a plurality of electrically interconnected vehicle control modules.

BACKGROUND OF THE INVENTION

Vehicle odometer tampering is a growing problem in the automotive industry. Traditionally, odometer tamperers have rolled back mechanical odometers to substantially reduce the displayed odometer mileage. This criminal effort was counteracted by designing mechanical odometers which would only roll in a positive direction, thus disabling reverse rolling which would reduce the displayed odometer mileage. However, criminals learned to remove the cluster assembly from the vehicle, and rolled back the mechanical odometers by partially disassembling the odometer.

Digital odometers were initially immune from odometer tampering, but in recent years clever criminals have developed methods of entering the memory location of the microcontroller which operates the digital odometers and altering the stored odometer mileage. This is typically accomplished by removing the cluster assembly and accessing the microcontroller electronically for altering the stored odometer mileage. Alternatively, criminals have infiltrated the cluster control module microcontroller by simply plugging into the vehicle diagnostics system and penetrating any electronic security barriers.

Accordingly, it is desirable to provide a method of preventing odometer tampering in vehicles having microcontrollers which electrically communicate with non-volatile memory locations for storing the odometer reading.

DISCLOSURE OF THE INVENTION

Recent vehicle designs have included a "multiplex ring" which comprises a plurality of microcontrollers which are electrically interconnected. The microcontrollers would typically include a cluster control module, engine control module, anti-lock brake system control module, speed control module, radio control module, etc. Such control modules also typically have a non-volatile memory location which stores data even when the vehicle power is disabled.

The present invention overcomes the above-referenced shortcomings of prior art odometer fraud prevention schemes by utilizing the multiplex ring to store an odometer mileage variable in each of a plurality of non-volatile memory locations in order to increase the level of difficulty of odometer tampering.

More specifically, the present invention provides a method of preventing odometer fraud in a vehicle having a multiplex ring including a plurality of vehicle control modules in electrical communication with each other, wherein the multiplex ring further includes a cluster control module with an odometer display. The method includes displaying an odometer mileage variable, and periodically storing the displayed odometer mileage variable in a non-volatile memory location in the cluster control module. The displayed odometer mileage variable is also periodically stored in a non-volatile memory location in at least one of the vehicle control modules other than the cluster control module, thereby increasing the level of difficulty of odometer tampering.

In a preferred embodiment, the step of displaying an odometer mileage variable includes reading the odometer mileage variable from each of the non-volatile memory locations and displaying the highest odometer mileage variable read from the non-volatile memory locations. The method also comprises only allowing positive updating of stored variables in the various non-volatile memory locations in order to further prevent tampering.

Accordingly, an object of the present invention is to provide a method of preventing odometer fraud by repeatedly storing an odometer mileage variable in a plurality of non-volatile memory locations.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
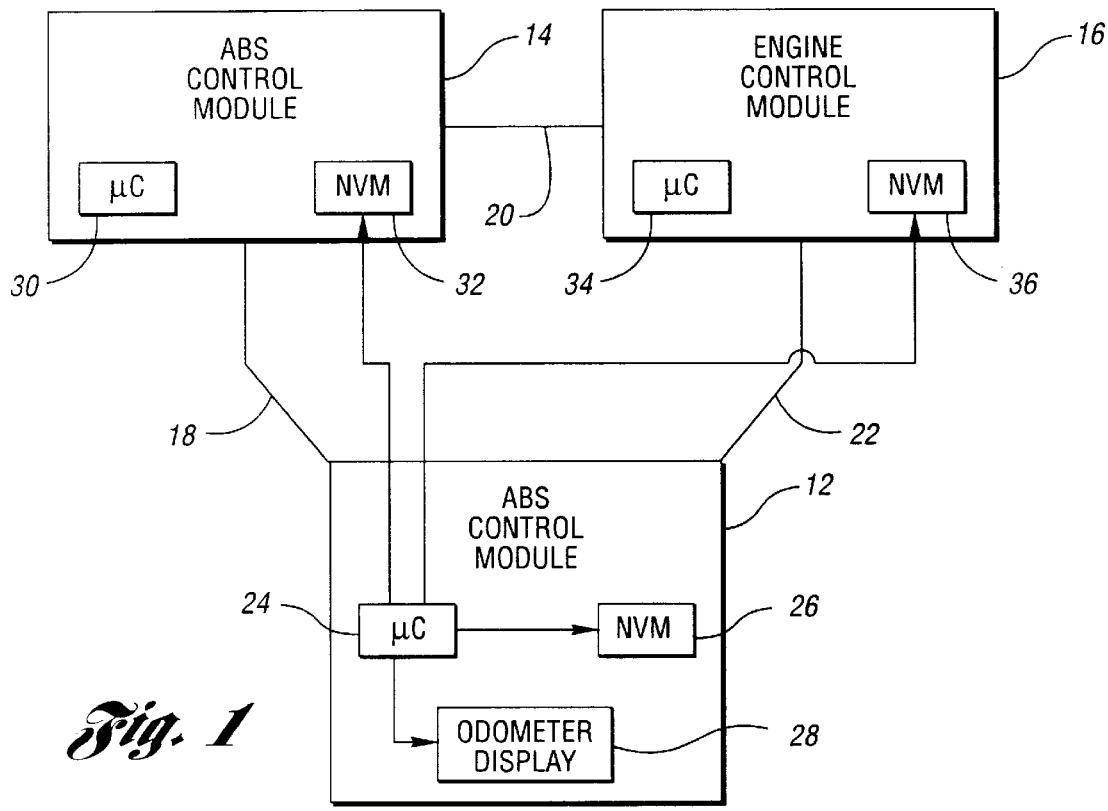
FIG. 1 shows a schematic flow chart of a multiplex ring illustrating a method of preventing odometer fraud in accordance with the present invention.

Referring to FIG. 1, a flow chart is shown illustrating a method of preventing odometer fraud in a vehicle in accordance with a first embodiment of the invention. FIG. 1 schematically shows a multiplex ring 10 which includes a plurality of control modules for operating various vehicle electronic systems. For example, the multiplex ring 10 includes a cluster control module 12, an anti-lock braking system control module 14, and an engine control module 16 electrically interconnected by connector means 18, 20, 22. A typical multiplex ring would also comprise a speed control module, a radio control module, etc. However, for purposes of example, only three control modules are illustrated.

As shown, the cluster control module 12 includes a microcontroller 24, a non-volatile memory location 26, and an odometer display 28 for displaying an odometer mileage variable in the vehicle. Similarly, the anti-lock braking system control module 14 includes a microcontroller 30 and non-volatile memory location 32. Also, the engine control module 16 includes a microcontroller 34 and non-volatile memory location 36.

In accordance with the first embodiment of the invention, the odometer display 28 displays an odometer mileage variable, and the microcontroller 24 of the cluster control module 12 periodically stores the displayed odometer mileage variable in the non-volatile memory location 26. The microcontroller 24 of the cluster control module 12 also directly stores the same odometer mileage variable data in the non-volatile memory locations 32 and 36 of the anti-lock braking system control module 14 and engine control module 16, respectively, through the connector means 18 and 22.

This communication is made possible by the communications protocol of the multiplex ring 10. The Society of Automotive Engineers has developed a U.S. industry standard, termed "J1850", which establishes protocol and timing of data transmittal between control modules, as well as establishing communication priority and establishing how data transmission starts and stops. Ford Motor Company, the assignee of the present application, has developed its own Standard Corporate Protocol (SCP) as an adaptation of the J1850 protocol. Most foreign countries use the "CAN" protocol for multiplex ring control module protocol.

These communication standards allow electrical communication between control modules, which enables the odometer mileage variable to be stored in a plurality of discrete non-volatile memory locations within the vehicle. By repeatedly storing the odometer mileage variable in various non-volatile memory locations 26, 32, 36, etc., vehicle odometer tampering becomes extremely difficult because the tamperer must gain entry to and break the software code in a plurality of different control module locations without visibly damaging the vehicle.

The present invention also comprises a "read and update" step in which the cluster control module 24 reads the stored odometer mileage variable in each of the plurality of non-volatile memory locations 26, 32, 36, and updates the odometer display 28, and also causes each non-volatile memory location 26, 32, 36 to store the highest odometer mileage variable stored in any of the non-volatile memory locations. This read and update step is preferably done every 10 seconds on a timer, which means that the tamperer must successfully enter each non-volatile memory location 26, 32, 36 in each of the control modules 12, 14, 16 and make the desired odometer mileage variable change within the time allotted by the timer (preferably 10 seconds), prior to the next read and update in which the microcontroller selects the highest odometer mileage variable stored in any of the plurality of non-volatile memory locations 26, 32, 36. This read and update step may be performed on a timer periodically, or may be performed as the ignition key is turned on, or at any variety of periodic points in time.

Another feature of the invention is that each non-volatile memory location 26, 32, 36 only allows positive odometer mileage updates. Accordingly, the tamperer must break another level of security to reduce the stored odometer mileage variables.

The present invention is also useful in service replacement of odometers because the read and update step would cause the greatest odometer mileage variable stored in any of the non-volatile memory locations to be displayed on the odometer display, and therefore the odometer would not need to be preset before installation in a used vehicle. This will save a significant amount of service handling time.

Figure 2:
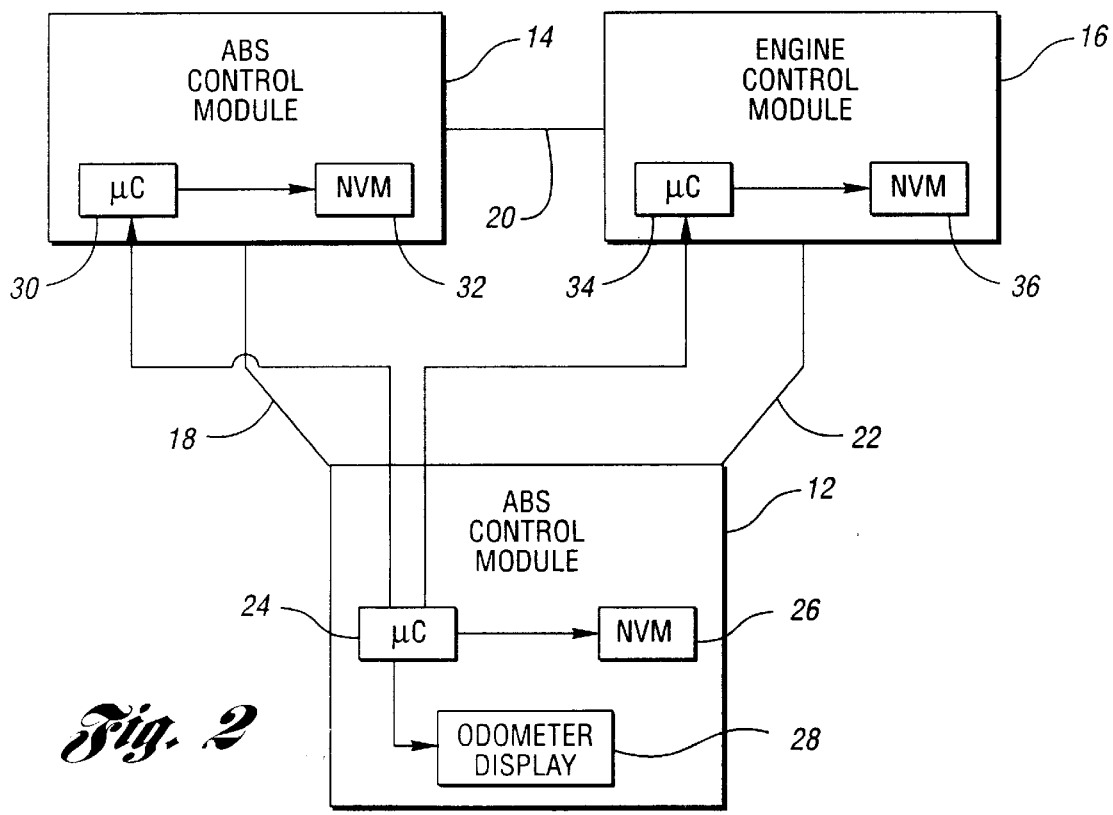
FIG. 2 shows a flow chart of a multiplex ring illustrating a method of preventing odometer fraud in accordance with an alternative embodiment of the present invention.

An alternative embodiment of the invention is illustrated in FIG. 2. As shown in FIG. 2, the cluster control module microcontroller may directly update the cluster control module non-volatile memory location 26, but indirectly update the other non-volatile memory locations 32,36 by electrically communicating with their respective microcontroller 30,34, as illustrated by the arrows in FIG. 2.

Accordingly, the embodiments of the present invention provide a method of preventing odometer fraud in a vehicle having a multiplex ring 10 including a plurality of vehicle control modules 12, 14, 16 in electrical communication with each other. The method comprises the following steps: a) displaying an odometer mileage variable; b) periodically storing the displayed odometer mileage variable in a non-volatile memory location in the cluster control module; c) periodically storing the displayed odometer mileage variable in a non-volatile memory location in at least one of the vehicle control modules other than the cluster control module, thereby increasing the level of difficulty of odometer tampering.

The step of periodically storing the displayed odometer mileage variable in a non-volatile memory location in the cluster control module may comprise storing the displayed odometer mileage variable repeatedly after every predetermined period time, or each time the vehicle ignition is turned on. The step of displaying the odometer mileage variable may include reading the odometer mileage variable from each of the non-volatile memory locations, and displaying the highest odometer mileage variable read from the non-volatile memory locations.

The step of periodically storing the displayed odometer mileage variable in a non-volatile memory location in at least one of the vehicle control modules other than the cluster control module includes updating the stored odometer mileage variable in each non-volatile memory location by replacing the stored odometer mileage variable with a replacement number equal to the stored odometer mileage variable in the non-volatile memory location of the cluster control module only if the replacement number is greater than the stored odometer mileage variable in the particular non-volatile memory location being updated. Accordingly, only positive updates are allowed, which further raises the level of difficulty of tampering.

While the best modes for carrying out the invention have been described in detail, those familiar with the art to which this invention relates will recognize various alternative designs and embodiments for practicing the invention within the scope of the appended claims.

What is claimed is:

1. A method of preventing odometer fraud in a vehicle having a multiplex ring including a plurality of vehicle control modules in electrical communication with each other, wherein the multiplex ring further includes a cluster control module with an odometer display, the method comprising:

displaying an odometer mileage variable;

periodically storing the displayed odometer mileage variable in a non-volatile memory location in the cluster control module;

communicating the non-volatile memory location in the cluster control module with a non-volatile memory location in at least one of the vehicle control modules other than the cluster control module for periodically storing the displayed odometer mileage variable in said non-volatile memory location in at least one of the vehicle control modules other than the cluster control module, thereby increasing the level of difficulty of odometer tampering; and wherein said step of periodically storing the displayed odometer mileage variable in a non-volatile memory location in at least one of the vehicle control modules other than the cluster control module comprises:

communicating the microcontroller of the cluster control module with the microcontroller of the particular control module to be updated in order to transfer the displayed odometer mileage variable information; and communicating the microcontroller of the particular control module being updated with its respective non-volatile memory location for updating the odometer mileage variable in the non-volatile memory location.

2. The method of claim 1, wherein said step of periodically storing the displayed odometer mileage variable in a non-volatile memory location in the cluster control module comprises storing the displayed odometer mileage variable repeatedly after every predetermined period of time.

3. The method of claim 1, wherein said step of periodically storing the displayed odometer mileage variable in a non-volatile memory location in the cluster control module comprises storing the displayed odometer mileage variable each time the vehicle ignition is turned on.

4. The method of claim 1, wherein said step of displaying an odometer mileage variable comprises:

reading the odometer mileage variable from each of said non-volatile memory locations; and displaying the highest odometer mileage variable read from said non-volatile memory locations.

5. The method of claim 1, wherein said step of periodically storing the displayed odometer mileage variable in a non-volatile memory location in at least one of the vehicle control modules other than the cluster control module comprises updating the stored odometer mileage variable in each non-volatile memory location by replacing the stored odometer mileage variable with a replacement number equal to the stored odometer mileage variable in the non-volatile memory location of the cluster control module only if the replacement number is greater than the stored odometer mileage variable in the particular non-volatile memory location being updated.

6. The method of claim 1, wherein said step of periodically storing the displayed odometer mileage variable in a non-volatile memory location in at least one of the vehicle control modules other than the cluster control module comprises updating the particular non-volatile memory location directly from the cluster control module microcontroller.

7. A method of preventing odometer fraud in a vehicle having a multiplex ring including a plurality of vehicle control modules in electrical communication with each other, wherein the multiplex ring further includes a cluster control module with an odometer display, the method comprising:

periodically storing the displayed odometer mileage variable in a non-volatile memory location in the cluster control module;

communicating the non-volatile memory location in the cluster control module with a non-volatile memory location in at least one of the vehicle control modules other than the cluster control module for periodically storing the displayed odometer mileage variable in said non-volatile memory location in at least one of the vehicle control modules other than the cluster control module by updating a stored odometer mileage variable in each non-volatile memory location by replacing the stored odometer mileage variable with a replacement number equal to the stored odometer mileage variable in the non-volatile memory location of the cluster control module only if the replacement number is greater than the stored odometer mileage variable in the particular non-volatile memory location being updated, thereby increasing the level of difficulty of odometer tampering;

reading the odometer mileage variable from each of said non-volatile memory locations; and displaying the highest odometer mileage variable read from said non-volatile memory locations.

8. A method of preventing odometer fraud in a vehicle including a plurality of vehicle control modules in electrical communication with each other, and including a cluster control module with an odometer display, the method comprising:

displaying an odometer mileage variable;

periodically storing the displayed odometer mileage variable in a non-volatile memory location in the cluster control module;

periodically storing the displayed odometer mileage variable in a non-volatile memory location in at least one of the vehicle control modules other than the cluster control module, thereby increasing the level of difficulty of odometer tampering; and wherein said step of periodically storing the displayed odometer mileage variable in a no-volatile memory location in at least one of the vehicle control modules other than the cluster control module comprises updating the stored odometer mileage variable in each non-volatile memory location by replacing the stored odometer mileage variable with a replacement number equal to the stored odometer mileage variable in the non-volatile memory location of the cluster control module only if the replacement number is greater than the stored odometer mileage variable in the particular non-volatile memory location being updated.

\* \* \* \* \*